United States Patent [19]
Witte

[11] 4,383,730
[45] May 17, 1983

[54] OPTICAL FOUR-GATE COUPLER

[75] Inventor: Hans H. Witte, Munich, Fed. Rep. of Germany

[73] Assignee: Siemens Aktiengesellschaft, Berlin and Munich, Fed. Rep. of Germany

[21] Appl. No.: 182,061

[22] Filed: Aug. 28, 1980

[30] Foreign Application Priority Data

Sep. 24, 1979 [DE] Fed. Rep. of Germany ....... 2938526

[51] Int. Cl.³ .............................................. G02B 5/14
[52] U.S. Cl. .............................. 350/96.16; 350/96.15
[58] Field of Search ......................... 350/96.16, 96.15

[56] References Cited

PUBLICATIONS

Auracher et al., "Optimized Layout for a Data Bus System Based on a New Planar Access Coupler", Applied Optics, vol. 16, #12, 12/77, pp. 3140–3142.
Witte, "New Optical Planar Coupler in a Data Bus System with Single Multimode Fibers", Fibres Optiques, vol. 56, #12, 1976, pp. 607–608.

*Primary Examiner*—David K. Moore
*Attorney, Agent, or Firm*—Hill, Van Santen, Steadman, Chiara & Simpson

[57] ABSTRACT

An optical four-gate coupler, which is particularly useful when used in a bus system and has a pair of input fibers and a pair of output fibers which are arranged with the planar end faces of the four fibers abutting one another in an axial offset fashion characterized by one of the input fibers having a smaller cross-section than the remaining fibers.

10 Claims, 10 Drawing Figures

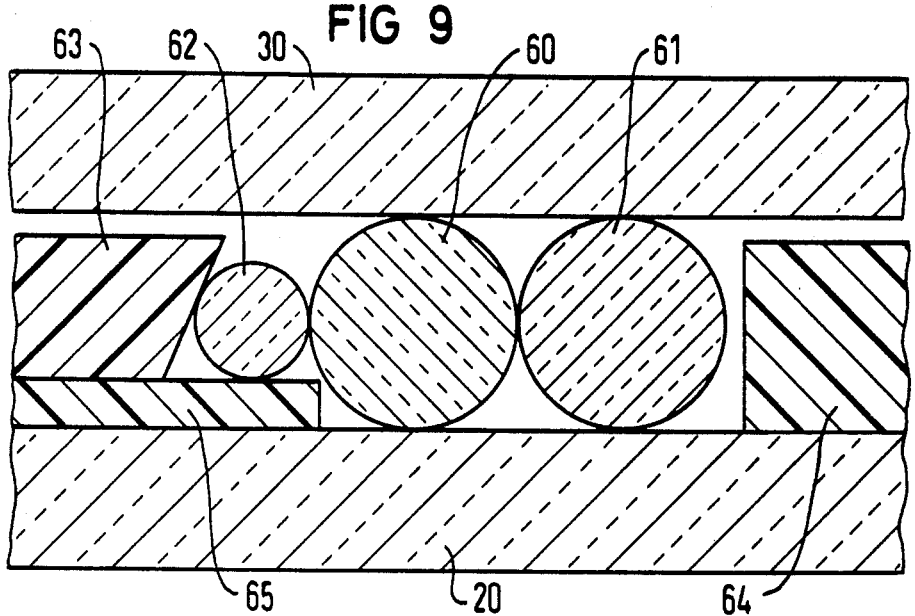
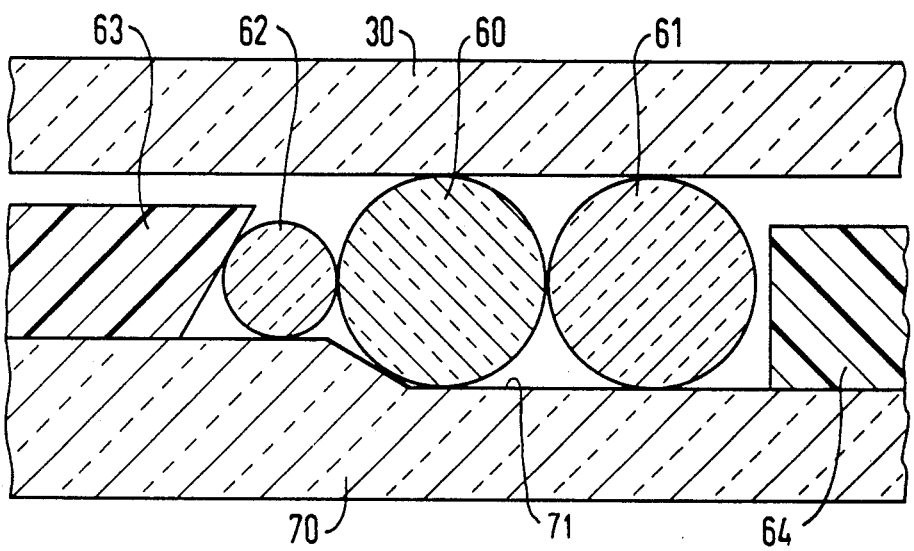

OPTICAL FOUR-GATE COUPLER

BACKGROUND OF THE INVENTION

The present invention is directed to an optical four-gate coupler which has a pair of input coupling multimode optical fibers and a pair of output coupling multimode fibers in which the planar end faces of the four fibers abut one another in an axial offset fashion.

Optical four-gate couplers which have a pair of input multimode optical fibers connected to a pair of output fibers are known and an example is disclosed by H. H. Witte and V. Kulich "Planar Input-Output Couplers in Thick-Film Technology for Multimode Optical Fibers", *Siemens Forsch.-u-Entwickl.-Ber.*, Vol. 8, 1979, No. 3, pages 141-143. In the case of known couplers, the diameter of all the optical fibers are of equal size and as a consequence the degree of input coupling is equal to the degree of output coupling. If such couplers are employed in optical data buses with T-network structures, this results in an input coupling loss increasing linearly with the number of subscribers.

SUMMARY OF THE INVENTION

The present invention is directed to providing a four-gate coupler having a pair of input coupling optical fibers and a pair of output coupling optical fibers in which the degree of input and output coupling are largely independent of one another and the input coupling losses are substantially reduced.

In accordance with the invention, this object is achieved by an improvement in an optical four way coupler comprising a pair of input coupling multimode fibers and a pair of output coupling multimode fibers, said input fibers having abutting planar faces with the output fibers and axially offset thereto. The improvement comprises that one of the pair of input fibers has a smaller cross-section that the other three fibers.

In a four-gate coupler, one of the incoming fibers is from a branch connection and the other is from the main connection and hereafter referred to as the main incoming fiber. In a similar manner, one of the output coupling fibers is a main or transmitting fiber while the other is to a branch connection. Thus, if the incoming main fiber and the outgoing transmitting fiber are axially aligned, virtually nothing will be input coupled from the input branch fiber into the transmitting fiber and in a similar manner, nothing will be output coupled from the incoming main fiber to the outgoing branch fiber. With increasing axial offset, between the two incoming fibers and the two output fibers, input coupling from the incoming branch fiber to the transmitting fiber as well as output coupling from the main fiber to the output branch fiber will take place with more input and output coupling occurring with the greater offset. By the provision of the smaller cross-sectional surface of the input coupling fiber, which is the input branch fiber, the input coupling losses are decreased more strongly with increased fiber axial offset than the output coupling degree increases. If the offset corresponds to the dimension of the input branch coupling fiber, virtually the entire light input branch fiber is output coupled into the transmitting fiber. If the fiber axial offset is further increased, there is no change in the condition of the amount of light being input coupled to the transmitting fiber from the branch input fiber; however, the degree of output coupling is further increased. Thus, input coupling and output coupling can be adjusted independently of each other within certain ranges.

Virtually all types of optical fibers can be employed wherein different coupling relationships will result. In addition, to the conventional optical fibers which are circular in cross-section, it is also possible to employ optical fibers which have a rectangular cross-section.

In order to keep the geometric insertion losses small in the case of optical fibers having a circular cross-section, it is advantageous to arrange for the axes of all fibers to lie in one plane.

In addition to the geometric insertion losses, which occur because of the circular cross-section there are small losses due to light coupled into the fiber cladding. If, however, the total diameter (thick core and thin cladding) of the remaining fiber is equal to the core diameter of the fibers beyond the Four-Gate-Coupler to which they couple these additional losses are negligibly small because the lengths of the remaining fiber of the coupler are small. On the other hand, the diameter of the input coupling optical fiber from the branch connection should be as small as possible in order to be able to input couple as much light into the transmitting output optical fiber even in the case of a small axial offset for the fibers. It is therefore advantageous to provide the total surface of the input coupling branch optical fiber to be approximately equal to the radiating surface of the transmitter being connected to the other end thereof. In this case, the entire transmitting power will be connected to the branch input fiber and is then input coupled into the transmitting output fiber corresponding to the adjusted offset.

For example, the entire radiated power of an LED of the Burus type increases within wide boundaries with decreasing emission surfaces. It is therefore attempted to keep the radiating surface of the LED small and such a LED for example is very well suited as a transmitter. The total surface area of the input branching optical fiber should in this case be approximately equal to the radiating surface of the LED and in order to minimize the additional losses the thickness of the cladding of the input branching fiber should be small.

In this manner, the four-gate coupler is provided in which case a given degree of output coupling will guarantee a high input coupling and simultaneously low insertion losses. Such a four-gate coupler are particularly suited for use in optical bus systems with a T-network structure. It has been shown that through the utilization of the inventive coupler, the maximum number N of terminals, i.e. the number of subscribers, can be substantially increased.

BRIEF DESCRIPTION OF THE DRAWINGS

FIG. 9 is a third constructional embodiment for the coupler of the present invention; and FIG. 10 is a fourth constructional embodiment of the coupler in accordance with the present invention.

DESCRIPTION OF THE PREFERRED EMBODIMENTS

Figure 1:
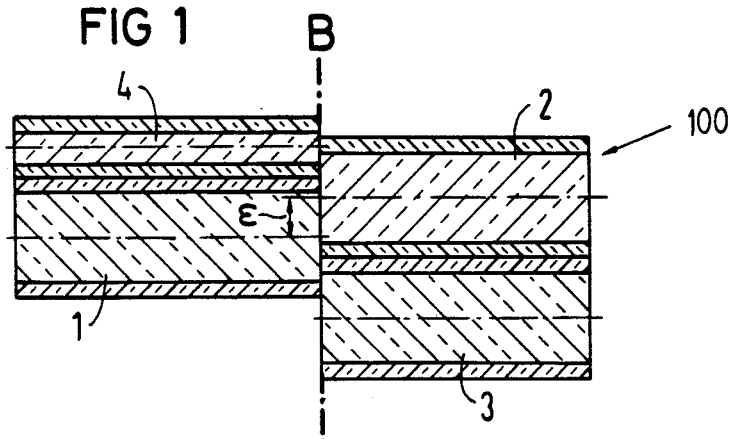
FIG. 1 is a longitudinal cross-section through a four-gate coupler in accordance with the present invention.

The principles of the present invention are particularly useful when incorporated in a four-gate coupler generally indicated at 100 in FIG. 1. The coupler 100 has an input fiber 1, which is a main input fiber and a pair of output fibers formed by a transmitting output fiber 2 and a branching or tapping off output fiber 3. All three fibers 1, 2 and 3 are for example stepped indexed cladded fibers with a core diameter of 200 µm and a cladding thickness of approximately 5 µm. For clarification the cladding of the fibers of FIG. 1 are illustrated to be thicker in proportion to the core diameter.

A second input fiber 4 is a branch input coupling fiber who has a core diameter of approximately only 25 µm with a cladding of a thickness of 5 µm. The fiber axial offset as illustrated in FIG. 1 is ε. Other fibers and diameters are also possible. Thus, for example a thicker input coupling optical fiber can be used for input coupling fiber 4. Likewise, the input coupling fiber 4 without cladding can be utilized.

Figure 2:
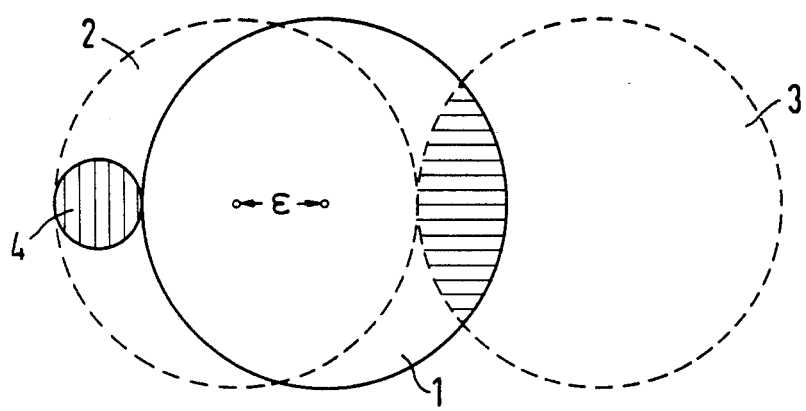
FIG. 2 is an end view showing the relationship of the fiber along the coupling plane A-B.

As illustrated in FIG. 2, the relationship of the fibers 1 and 4 to the fibers 2 and 3 is illustrated along the plane A-B as illustrated in FIG. 1 and the fiber claddings are now shown in this illustration. The FIG. 2 clearly shows that the overlapping of the incoming main fiber 1 and the incoming branch fiber 4 with the transmitting fiber 2 and the branching output fiber 3. In the case of the adjusted offset ε according to FIG. 2, the overlapping is already so great that virtually all of the light of the incoming branch fiber 4 is coupled into the transmitting output fiber 2.

Figure 3:
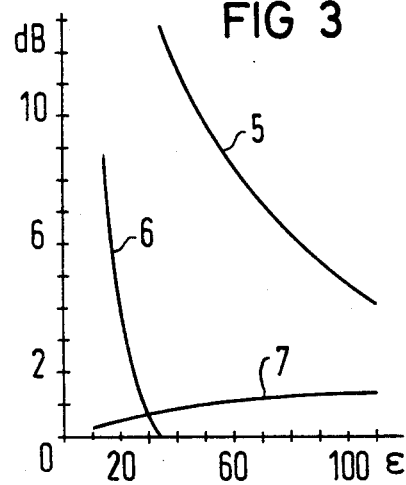
FIG. 3 is a graph illustrating the various conditions for the coupler in accordance with the present invention.

In FIG. 3, various conditions for a coupler 100 are illustrated with the output coupling degree being illustrated by the curve 5, with the input coupling loss from the input branching fiber 4 illustrated by the curve 6, and with the insertion loss illustrated by the curve 7. Each of these curves are plotted as a decibel against the amount of offset ε. If $\eta(i \rightarrow j)$ designates the common profile of the core surface of the fibers i and j relative to the core surface of the fiber i there results in decibels as a function of the fiber axial offset ε the following relationships:

Output coupling degree: $-10 \lg \eta(1 \rightarrow 3)$;
Input coupling loss: $-10 \lg \eta(4 \rightarrow 2)$; and
Insertion loss: $-10 \lg (\eta(1 \rightarrow 2) + \eta(1 \rightarrow 3))$ From the curves shown in FIG. 3, it is clearly apparent how the input coupling loss according to curve 6 decreases with increased fiber axial offset ε. In the case of offset ε of approximately 35 µm, which corresponds to the entire fiber diameter or the core diameter of the input branching fiber 4 plus twice the cladding thickness, the input coupling loss is virtually zero.

Figure 4:
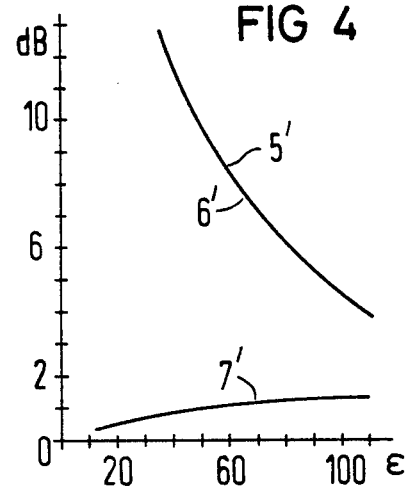
FIG. 4 is a graph showing corresponding curves of various conditions for a known coupler structure.

The same conditions are shown in FIG. 4 for a conventional coupler, in which all four fibers have the same diameter. As can be seen from this figure, on account of the same fiber diameter, the input coupling losses for the branch input fiber is illustrated by a curve 6' and corresponds to the output coupling degree which is amount of light transferred from the main input 1 to the branch output 3 as illustrated by the curve 5'. Virtually loss-free input coupling with simultaneously variable output coupling is not possible in the case of the conventional four-gate coupled.

Figure 5:
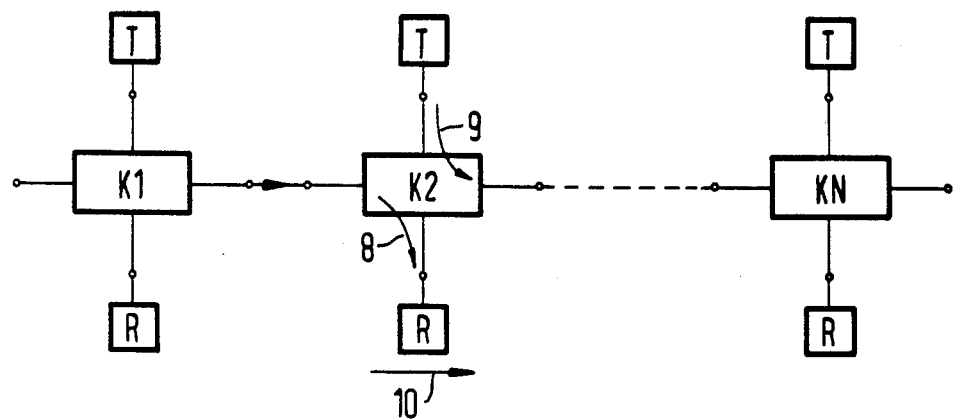
FIG. 5 is a schematic presentation of an optical data bus with a T-network utilizing couplers of the present invention.

In FIG. 5, a basic construction of an optical data bus with a T-network structure or setup with N identical four-gate couplers of the present invention is illustrated. Each of the four-gate couplers is numbered consecutive K1, K2, . . . KN. Each coupler is connected with a transmitter T and a receiver R, as indicated by the arrows 8, 9 and 10 for the coupler K2. The output of the transmitter is input coupled by the arrow 9 while the branching off to the receiver output is indicated by the arrow 8, and the light being transmitted by the main line to the transmitting line is indicated by the arrow 10. Thus, the arrow shows the output coupling degree, the input coupling loss, and the insertion loss.

Figure 6:
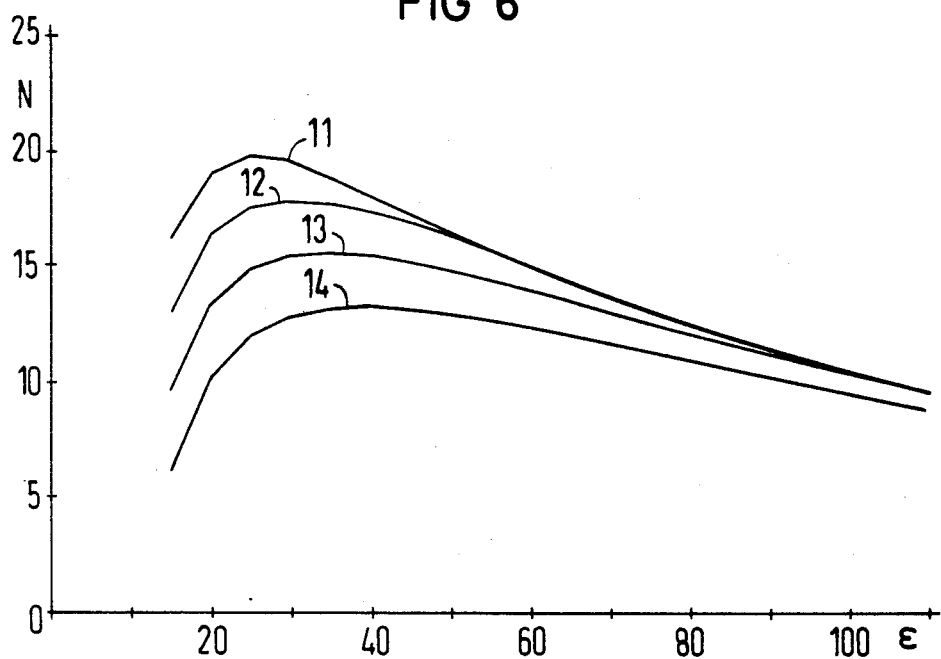
FIG. 6 is a graphical presentation showing the maximum number of terminals in response to the fiber axial offset.

For a data bus according to FIG. 5, the maximum number N of couplers and hence the terminals is illustrated as a function of fiber axial offset ε in FIG. 6. Each of the individual couplers correspond to the couplers according to the sample embodiment of FIG. 1. On the transmitting side for example, a 400 µW power can be input coupled into the fibers. On the detector side, a minimal power of 4 nW is required. If one disregards path attenuation, curve 11 will result. The additional illustrated curves 12, 13 and 14 relate to various diameters of the input branch coupling fiber 4. Thus, the curve 12 is for a fiber 4 having a diameter which amounts to 50 µm, curve 13 is for the fiber 4 having a diameter of 100 µm and finally curve 14 is when the fiber 4 has a diameter of 200 µm which is the same as the other or the remaining fibers 1, 2 and 3 of the coupler. As is apparent, the maximum number N of terminals decreases with the increasing diameter of the input coupling fiber 4. Moreover, with increasing diameters for the fiber 4, this maximum number N shifts to a greater fiber axial offset ε. A comparison with these curves with the diameter of the input coupling fibers shows that except for the conditions of curve 11, the maximum number N does not occur in the case of fiber axial offset ε in which the coupling input loss would be zero.

The comparison of the curves 11 and 14 clearly shows the advantage of utilizing the inventive four-gate coupler 100 compared to a known four-gate coupler. The line 14 represents the curve for a coupler in which all four fibers are identical. As is apparent through utilization of the inventive coupler, a considerable greater number of terminals can be connected to a data bus in a T-network structure.

The four-gate coupler 100 in accordance with the present invention can be made by anyone of the following techniques:

In the first embodiment, a substrate 20 and a superstrate or cover 30 are provided with guide limit stops. As illustrated the stops 21 and 21' are placed on the substrate 20 with spacing to receive the fiber 1 and the stops 31 and 31' are on the cover 30 with spacing for the fiber 1. The spacing between stops 21 and 21' or 31 and 31' is selected so that the fiber 1 touches an edge of each stop. The thickness of the guide stops 21, 21', 31 and 31' is determined by the ratio of the diameter of the fiber 1 and the fiber 4 so that a connection plane of the axis of both fibers is disposed parallel to the substrate 20. As illustrated the diameter of the fiber 1 equals the diameter of fiber 4 plus the thickness of stops 21 and 31. The guide limit stops may consist of plastic or synthetic material which can be cemented onto each of the substrates or can consist of a photosensitive material that can be photolithographically produced. An additional stop 22 and 22' are placed on the stops 21 and 21', respectively, and may be formed of a contact pressure foil. These additional stops 22 and 22' hold the small diameter fiber 4 against the large fiber 1 as illustrated. To prevent upward movement, the cover 30 with its stops 31 and 31' is applied and a cement or bonding agent is used to ensure the necessary mechanical stability of the unit being formed with two fiber pairs of fibers 1 and 4. The unit would have a large number of fiber pairs by repeating the provision of stops in the desired spacing.

After forming the unit, which is illustrated containing two fiber pairs, it is separated along a plane extending perpendicular to the axis of the fibers 1 and 4 and polished along the plane. A similar unit for the fibers 2 and 3 is prepared in a similar manner with a pair of substrates having fiber stops holding the two fibers 2 and 3 in contact with each other. This unit is also cut along a plane extending perpendicular to the axis of the fibers and polished.

The two units which are made in this manner are then brought together with their polished end faces lying in a single plane and the axis of all of the fibers lying also in a single plane. The two units can be shifted relative to each other to a point of adjustment to provide the desired axial offset and then subsequently cemented together. Finally, the individual couplers are obtained by cutting or sawing through in a longitudinal direction between the fiber pairs such as on planes C-D of FIG. 7.

Figure 7:
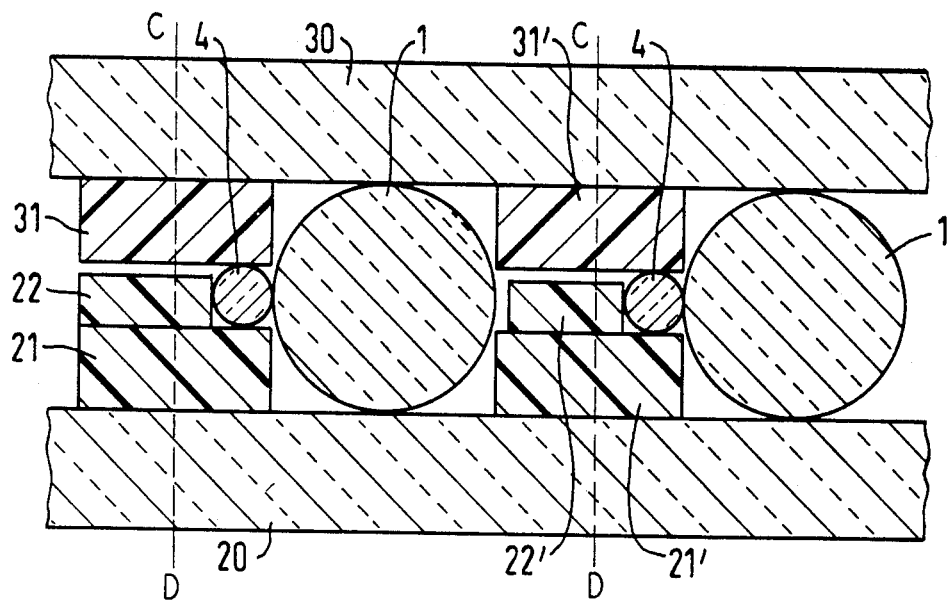
FIG. 7 is a cross-sectional view of one constructional embodiment of the coupler of the present invention.
Figure 8:
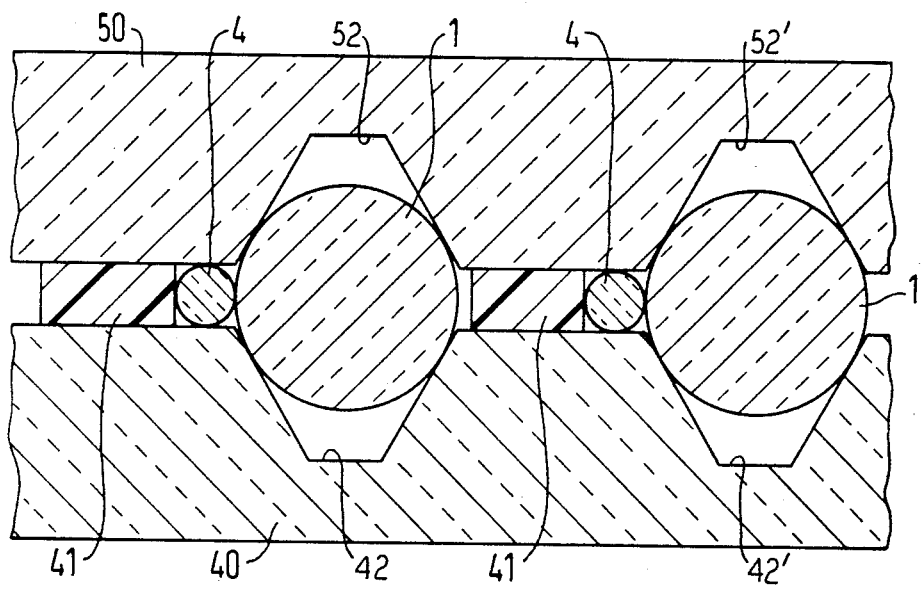
FIG. 8 is a cross-sectional view of a second embodiment of the construction of the coupler of the present invention.

In a constructional embodiment illustrated in FIG. 8, the fiber pairs 1 and 4 are located with the aid of technique of preferential etching in silicon. In order to compensate for the height variations or differences in diameters between the fibers 1 and 4, the silicon substrate 40 is provided with grooves 42 and 42' and the cover 50 is provided with grooves 52 and 52' which are aligned with the grooves such as 42 and 42'. As illustrated, the grooves such as 42 and 52 coact to space these planar surfaces of the substrate 40 and the cover 50 apart a distance equal to the diameter of the fiber 4. To hold the fiber 4 in contact with the fiber 1, a stops or guides 41 and 41' are provided and again may be formed by contact foil. Once the unit illustrated in FIG. 8 has been assembled, it is held together by use of cement and then assembled with the units containing fibers such as 2 and 3 in the manner of the first embodiment of FIG. 7.

In the first and second constructional embodiments of FIGS. 7 and 8, the two halves of the coupler are provided with one half containing fibers 1 and 4 and the other containing fibers 2 and 3. Each of these halves is manufactured separately and then joined together in an offset relationship. The substrate thicknesses must be selected so that all of the axes of the fibers lie in one plane. In the manufacturing technique described in the following two embodiments a common substrate is employed and therefore a guarantee of having the axes of the fibers lying in the same place is obtained.

In the third constructional embodiment as illustrated in FIG. 9, two thick fibers 60 and 61 and one smaller fiber 62 are arranged adjacent each other on a substrate 20 with the thick fiber 60 between the small fiber 62 and the other thick fiber 61. To hold the small fibers 62 in contact with the fiber 60, a plate 63 with an obliquely extending edge, which plate may be of either plastic or glass is provided. This plate 63 will prevent the deviation of fiber 62 in a lateral direction and in height relative to the fiber 60. On another side, a contact foil such as 64 prevents movement of the fiber 61 away from the fiber 60. To ensure that the desired height and that the axis of the fiber 62 lies in the same plane as the axes of the fibers 60 and 61, a shim or plate 65 is provided.

In the constructional embodiment illustrated in FIG. 10, again the two larger fibers 60 and 61 as well as the smaller fibers 62 are arranged with their axis lying on the same plane. In this embodiment, the substrate 70 is provided with an etched depression 71 which receives the fibers 60 and 61 which are held in place by a stop such as 64'. The fiber 62 rests on an elevated portion of the substrate 70 and is held by a glass or plastic plate 63' which has an oblique edge or surface to hold the fiber 62 in the desired position.

After the fibers 60, 61 and 62 are secured either in the embodiment of FIG. 10 or the embodiment of FIG. 9 such as by cement, each unit is again separated on a plane extending perpendicular to the axis of the fibers. The end faces are then polished and the two resulting halves are then joined permanently in the desired offset relationship. In so doing, each half will have a fiber which is not optically utilized.

In the sample embodiment, only the inventive coupler is illustrated. It should be noted that the free ends of each of the fibers of the four-gate coupler can be provided with conventional plug type connections so that the fibers can be connected into a system of fibers.

Although various minor modifications may be suggested by those versed in the art, it should be understood that I wish to embody within the scope of the patent granted hereon, all such modifications as reasonably and properly come within the scope of my contribution to the art.

I claim:

1. In an optical four-gate coupler for connecting a branch comprising a pair of input fibers and a pair of output fibers, said pairs of input fibers being arranged with planar end faces abutting planar end faces of the pair of output fibers with an axial offset, one of said pair of input fibers being an input branch fiber and one of the pair of output fibers being an output branch fiber, the improvements comprising means for decreasing the input coupling loss of the input branch fiber independently and faster than the increase of the degree of coupling of the output branch with an increased axial offset, said means including said input branch fiber being of a smaller cross-section than the other three fibers of the coupler.

2. In an optical four-gate coupler comprising a pair of input fibers and a pair of output fibers, said pairs of input fibers being arranged with planar end faces abutting planar end face of the pair of output fibers with an axial offset, the improvement comprising one of the pair of input fibers having a smaller cross-section than the other three fibers so that the input coupling loss decrease faster with an increase of the axial offset than the increase in the degree of the output coupling.

3. In an optical four-gate coupler according to claim 1, which includes a transmitter coupled onto the other end of said one input optical fiber, said one input coupling fiber having a total cross-section approximately equal to the radiating surface of the transmitter.

4. In an optical four-gate coupler according to claim 1, wherein each of the output fibers and the other input fiber are cladded fibers with preferentially a thin cladding compared to the core diameters and with a total diameter equal to the core diameter of the fibers beyond the four-gate-coupler to which they couple.

5. In an optical four-gate coupler according to claim 4, which includes a transmitter at the other end of the one input fiber, said input fiber having a total cross-section approximately equal to the radiating surface of the transmitter.

6. In an optical four-gate coupler according to claim 1, where the axes of all four fibers lie in one plane.

7. In an optical four-gate coupler according to claim 6, which includes a transmitter at the other end of the one input fiber, said one input fiber having a total cross-section approximately equal to the radiating surface of the transmitter.

8. In an optical four-gate coupler according to claim 6, wherein each of the output fibers and the other input fiber are cladded fibers.

9. In an optical four-gate coupler according to claim 8, which includes a transmitter connected to the other end of the one input fiber, said one input coupling fiber having a total cross-sectional area equal to the radiating surface of said transmitter.

10. In an optical four-gate coupler according to claim 1, which is adapted for utilization with identical four-gate couplers for a bus system with a T-network structure.

* * * * *